US009495988B1

(12) United States Patent
Liu et al.

(10) Patent No.: US 9,495,988 B1
(45) Date of Patent: Nov. 15, 2016

(54) DEPENDENT WRITE FAULT THRESHOLD

(71) Applicant: Seagate Technology LLC, Cupertino, CA (US)

(72) Inventors: Xiong Liu, Singapore (SG); Qiang Bi, Singapore (SG); Choon Kiat Lim, Singapore (SG); MingZhong Ding, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/850,560

(22) Filed: Sep. 10, 2015

Related U.S. Application Data

(63) Continuation-in-part of application No. 14/520,110, filed on Oct. 21, 2014, now Pat. No. 9,236,073.

(51) Int. Cl.
G11B 27/36 (2006.01)
G11B 5/596 (2006.01)
G11B 5/012 (2006.01)
G11B 5/09 (2006.01)

(52) U.S. Cl.
CPC ......... *G11B 5/59627* (2013.01); *G11B 5/012* (2013.01); *G11B 5/09* (2013.01)

(58) Field of Classification Search
CPC ......... G11B 19/04; G11B 15/04; G11B 5/58; G11B 5/59677; G11B 5/59655; G11B 5/596; G11B 5/012; G11B 2220/20; G11B 2220/90; G11B 27/3027; G11B 27/36
USPC ....... 360/75, 77.08, 77.04, 77.01, 77.02, 60, 360/31, 48
See application file for complete search history.

(56) References Cited

U.S. PATENT DOCUMENTS

| | | | |
|---|---|---|---|
| 6,310,741 B1 | 10/2001 | Nishida et al. |
| 6,384,997 B1 | 5/2002 | Wu et al. |
| 6,421,197 B1 | 7/2002 | Abdelnour |
| 6,442,705 B1 | 8/2002 | Lamberts |
| 6,657,805 B2 | 12/2003 | Nishida et al. |
| 6,687,064 B1 | 2/2004 | Jiang et al. |
| 6,704,837 B2 | 3/2004 | Beardsley et al. |
| 6,717,757 B1 | 4/2004 | Levy |
| 6,795,262 B1 | 9/2004 | Codilian |
| 6,882,489 B1 | 4/2005 | Brunnett et al. |
| 6,940,679 B1 | 9/2005 | McNeil et al. |
| 6,975,468 B1 | 12/2005 | Melrose et al. |
| 7,154,690 B1 | 12/2006 | Brunnett et al. |
| 7,215,497 B2 | 5/2007 | Urata |
| 7,253,982 B1 | 8/2007 | Brunnett et al. |
| 7,304,816 B2 | 12/2007 | Johnson et al. |

(Continued)

*Primary Examiner* — Nabil Hindi
(74) *Attorney, Agent, or Firm* — Cesari & Reed, LLP; Kirk A. Cesari

(57) ABSTRACT

Systems, apparatuses, and processes having a dependent write fault threshold are disclosed. A first sector may have a first write fault threshold and a second sector, adjacent to the first sector, may have a second write fault threshold, and the write fault thresholds can be variable based on a position error signal value of an adjacent sector. In some embodiments, the adjacent sectors may each be in an adjacent track. In other embodiments, the adjacent sectors may be in the same track. Further, a track may have two write fault thresholds, a positive direction threshold and a negative direction threshold; in some embodiments, only one direction's threshold may be variable based on the position error signal of the adjacent sector, while the opposite direction's threshold may be set to a default (e.g. pre-determined not on a sector by sector basis) value.

14 Claims, 15 Drawing Sheets

(56) References Cited

U.S. PATENT DOCUMENTS

| | | |
|---|---|---|
| 7,423,828 B2 | 9/2008 | Emo et al. |
| 7,474,491 B2 * | 1/2009 | Liikanen ............ G11B 5/59633 360/75 |
| 7,545,593 B1 | 6/2009 | Sun et al. |
| 8,000,053 B1 | 8/2011 | Anderson |
| 8,587,889 B2 | 11/2013 | Kawabe |
| 8,619,381 B2 | 12/2013 | Moser |
| 8,736,995 B1 | 5/2014 | Wiesen et al. |
| 2007/0074073 A1 | 3/2007 | Chen et al. |
| 2007/0230691 A1 | 10/2007 | Elhamias |
| 2007/0236818 A1 | 10/2007 | Emo |
| 2008/0055765 A1 | 3/2008 | Abe et al. |
| 2008/0180826 A1 | 7/2008 | Cho |
| 2009/0180207 A1 | 7/2009 | Cho |
| 2012/0038997 A1 | 2/2012 | Jia |
| 2014/0118857 A1 | 5/2014 | Kashiwagi et al. |

* cited by examiner

| Track N | Sector 1, PES 4 | Sector 2, PES 8 | Sector 3, PES -2 |
|---|---|---|---|
| Track N+1 | Sector 1, WFT -14 | Sector 2, WFT -10 | Sector 3, WFT -18 |

DEPENDENT WRITE FAULT THRESHOLD

CLAIM TO PRIORITY

The present application is a continuation-in-part of and claims priority to copending U.S. patent application Ser. No. 14/520,110, filed Oct. 21, 2014, entitled "Write Fault Threshold for a Set of Tracks", the contents of which are hereby incorporated by reference in its entirety.

SUMMARY

In certain embodiments, an apparatus may comprise a control circuit configured to receive a position error signal value for a first data sector, and set a first write fault threshold for a second data sector adjacent the first data sector based on the position error signal value. The control circuit may also be configured to implement the first write fault threshold while writing data to the second data sector.

In certain embodiments, a method may comprise determining a position error signal value corresponding to a first data sector of a data storage medium, and selecting a first write fault threshold for a second data sector adjacent to the first data sector based on the position error signal value. The method may also comprise setting the first write fault threshold to be implemented when writing data to the second data sector In certain embodiments, a memory device can store instructions that, when executed, cause a processor to perform a process comprising determining a position error signal value corresponding to a first data sector of a data storage medium, and setting a first write fault threshold for a second data sector adjacent to the first data track based on the position error signal value. The process may also include implementing the first write fault threshold when writing data to the second data sector.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Further, the methods and functions described herein may be implemented as a device, such as a computer readable storage medium or memory device, including instructions that when executed cause a processor or other logic to perform the methods. For example, the methods and functions described herein may be implanted as a memory device storing instructions that when executed by control logic or a controller, cause such to perform a process.

Figure 1:
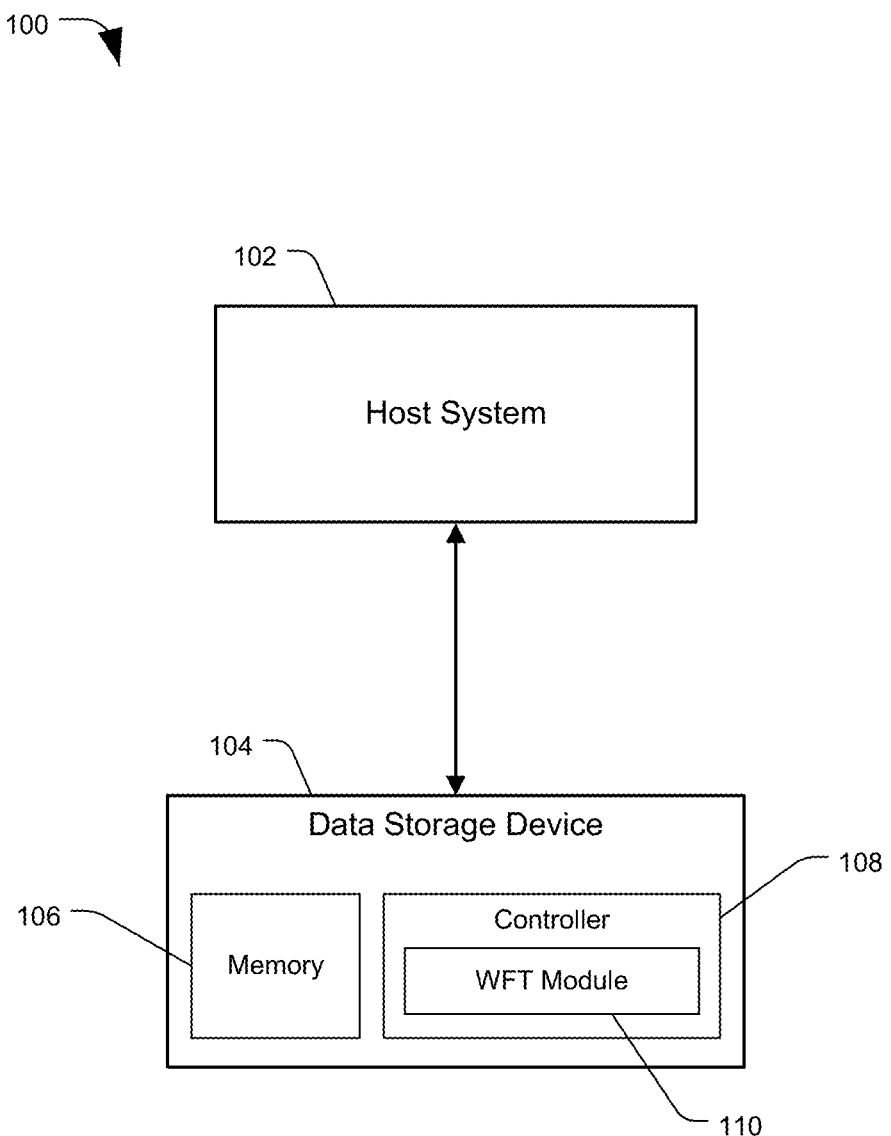
FIG. 1 is a diagram of a system having a write fault threshold for a set of tracks, in accordance with certain embodiments of the present disclosure.

FIG. 1 is a diagram of a system having a variable write fault threshold for one or more tracks or a set of tracks, generally designated 100, in accordance with certain embodiments of the present disclosure. The system 100 may include a host 102 and a data storage device (DSD) 104. The host 102 may also be referred to as the host system or host computer. The host 102 can be a desktop computer, a laptop computer, a server, a tablet computer, a telephone, a music player, another electronic device, or any combination thereof. Similarly, the DSD 104 may be any of the above-listed devices, or any other device which may be used to store or retrieve data. The host 102 and DSD 104 may be connected by way of a wired or wireless connection, or by a local area network (LAN) or wide area network (WAN). In some embodiments, the DSD 104 can be a stand-alone device not connected to a host 102 (e.g. a removable data storage device having its own case or housing), or the host 102 and DSD 104 may both be part of a single unit (e.g. a computer having an internal hard drive).

The DSD 104 may include a memory 106 and a controller 108. The memory 106 may comprise magnetic storage media such as disc drives, nonvolatile solid state memories such as Flash memory, other types of memory, or a combination thereof. The controller 108 may comprise one or more circuits or processors, or a combination thereof, configured to control operations of the data storage device 104, such as storing data to or retrieving data from the memory 106. The DSD 104 may receive a data read or write request from the host device 102, and use the controller 108 to perform data operations on the memory 106 based on the request.

DSD 104 may include a write fault threshold (WFT) module 110. The WFT module 110 may be a processor, controller, or other circuit, or it may be a set of software instructions that, when executed by a processing device, perform the functions of the WFT module 110. In some embodiments, the WFT module 110 may be part of or executed by controller 108. The WFT module 110 may control write operations or parameters of write operations to a memory, such as memory 106. For example, the WFT module 110 may control when to suspend write operations based on how far a write head has deviated from a set write path, based on a shared or combined write fault threshold for a set of tracks. A distance a head may move from the write path before write operations are suspended may be called a write fault threshold, and when the head moves beyond this distance, it may be called a write fault. In some embodiments, the WFT module 110 may determine a positional error signal (PES) value for data written to a first track, set a write fault threshold for a second track adjacent to the first track based on a combined write fault threshold for the first and second tracks and the PES value, and write data to the second track based on the write fault threshold.

For example, suppose a set of two tracks has a combined write fault threshold "budget" of 20% of track pitch (TP), so that both tracks combined may deviate from their intended ideal track centers by twenty percent of the pitch of a single track. If the first track has a PES value of 8% TP, the WFT module 110 may set a write fault threshold of 12% TP for the second track adjacent to the first track, ensuring the combine write fault amount does not exceed 20% TP.

In some embodiments, the WFT module 110 may determine a positional error signal (PES) value for a first sector on a first track, set a write fault threshold for a second sector on the first track based on the PES value, and implement the write fault threshold when writing data to the second sector. The first sector and the second sector may be adjacent sectors in the first track. In other embodiments, the first sector and the second sector may be adjacent sectors in adjacent tracks.

Figure 2:
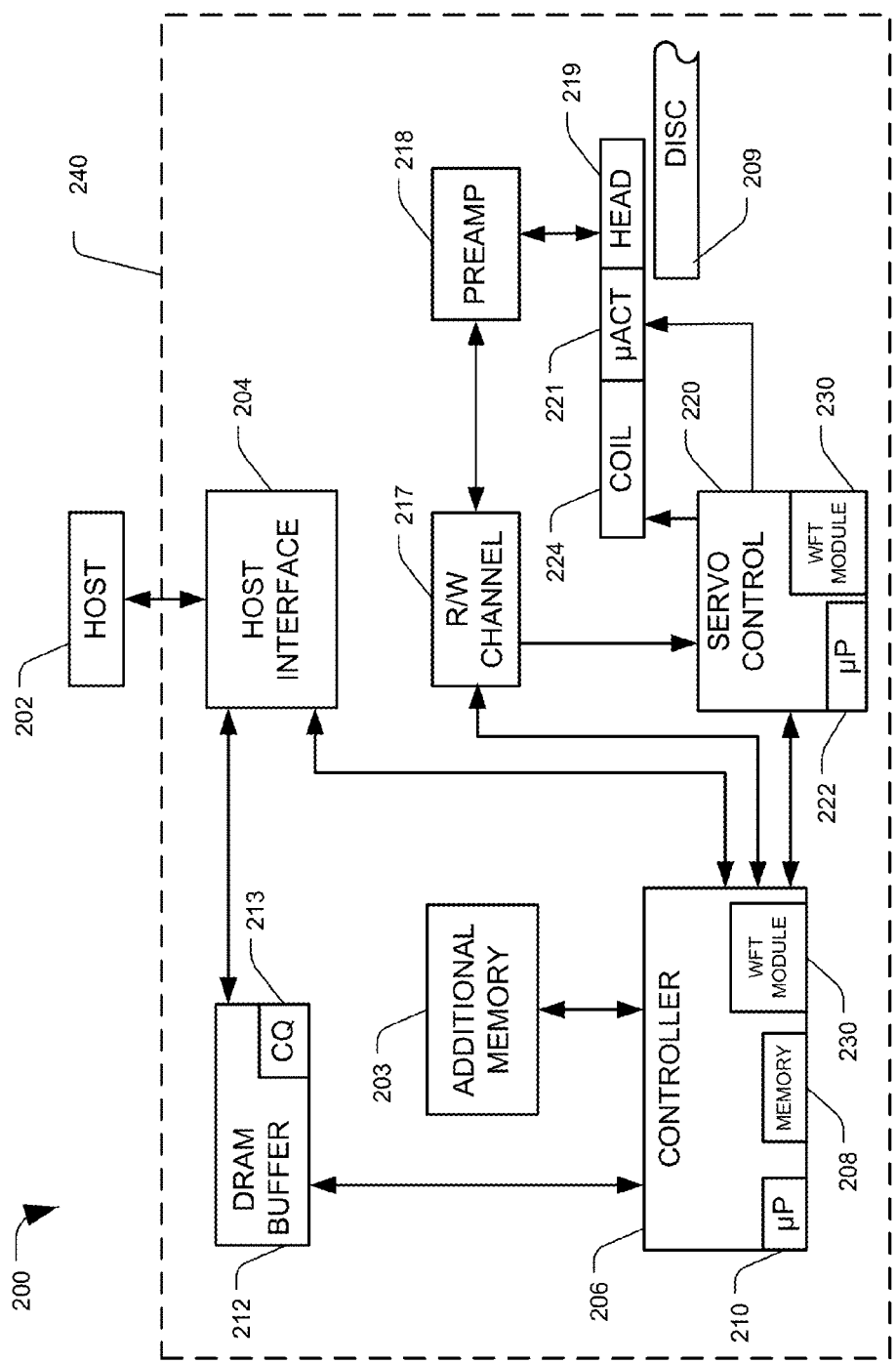
FIG. 2 is a diagram of a system having a write fault threshold for a set of tracks, in accordance with certain embodiments of the present disclosure.

FIG. 2 is a diagram of a system having a variable write fault threshold for one or more tracks or set of tracks, generally designated 200, in accordance with certain embodiments of the present disclosure. Specifically, FIG. 2 provides a functional block diagram of an example data storage device (DSD) 200. The DSD 200 may be a data storage device such as the device 104 shown in FIG. 1. The DSD 200 can communicate with a host device 202 (such as the host system 102 shown in FIG. 1) via a hardware or firmware-based interface circuit 204. The interface 204 may comprise any interface that allows communication between a host 202 and a DSD 200, either wired or wireless, such as USB, IEEE 1394, Compact Flash, SATA, eSATA, PATA, SCSI, SAS, PCIe, Fibre Channel, Ethernet, or Thunderbolt, among others. The interface 204 may include a connector (not shown) that allows the DSD 200 to be physically removed from the host 202. In some embodiments, the DSD 200 may have a casing 240 housing the components of the DSD 200, or the components of the DSD 200 may be attached to the housing, or a combination thereof. The DSD 200 may communicate with the host 202 through the interface 204 over wired or wireless communication.

The buffer 212 can temporarily store data during read and write operations, and can include a command queue (CQ) 213 where multiple pending operations can be temporarily stored pending execution. Commands arriving over the interface 204 may automatically be received in the CQ 213 or may be stored there by controller 206, interface 204, or another component.

The DSD 200 can include a programmable controller 206, which can include associated memory 208 and processor 210. In some embodiments, the DSD 200 can include a read-write (R/W) channel 217, which can encode data during write operations and reconstruct user data retrieved from a memory, such as disc(s) 209, during read operations. A preamplifier circuit (preamp) 218 can apply write currents to the head(s) 219 and provides pre-amplification of readback signals. A servo control circuit 220 may use servo data to provide the appropriate current to the coil 224, sometimes called a voice coil motor (VCM), to position the head(s) 219 over a desired area of the disc(s) 209. The controller 206 can communicate with a processor 222 to move the head(s) 219 to the desired locations on the disc(s) 209 during execution of various pending commands in the command queue 213.

In some embodiments, the DSD 200 may include solid state memory instead of or in addition to disc memory. For example, the DSD 200 can include an additional memory 203, which can be either volatile memory such as DRAM or SRAM, or nonvolatile memory, such as NAND Flash memory. The additional memory 203 can function as a cache and store recently or frequently read or written data, or data likely to be read soon. Additional memory 203 may also function as main storage instead of or in addition to disc(s) 209. A DSD 200 containing multiple types of nonvolatile storage mediums, such as a disc(s) 209 and Flash 203, may be referred to as a hybrid storage device.

DSD 200 may include a write fault threshold (WFT) module 230. The WFT module 230 may be a processor, controller, or other circuit, or it may be a set of software instructions that, when executed by a processing device, perform the functions of the WFT module 230. In some embodiments, the WFT module 230 may be part of or executed by controller 206, or part of or executed by servo control circuit 220. The WFT module 230 may control write operations or parameters of write operations to a memory, such as discs 209. For example, the WFT module 230 may control when to suspend write operations based on a shared write fault threshold budget for a set of tracks. Further, the WFT module 230 may control when to suspend write operations based on when a variable write fault threshold is exceeded during writing of a track of disc(s) 209.

As demand for data storage increases, it may be advantageous to implement ways to increase the areal density capability (ADC) of data storage devices; i.e. to increase the data capacity of a storage medium. The data storage capability of a given media recording surface, such as for disc(s) 209, can depend in part on the track density (e.g., the number of tracks per unit of radial width such as tracks per inch, TPI). Factors influencing a drive's tracks per inch capability (TPIC) can include the size, accuracy, and quality of the recording sub-system (RSS) (e.g., head, disk, preamp, read channel) as well as servo-mechanical elements. Increasing TPI, for example by bringing the centerlines of adjacent tracks closer together, can also increase areal data density of a storage medium.

Increasing TPI, however, may make the servo reliability or error rate of the recording system more susceptible to track misregistration (TMR) which can involve misalignments of the transducer with a given track. TMR errors can arise from a number of factors, including operational aspects of the recording subsystem or the servo-mechanical control system. TMR can also arise from effects external to the recording system, such as due to externally generated vibrations from moving the storage device, playing music on a connected host, or other factors.

To read or write data to a storage medium such as disc(s) 209, a data storage device may employ servo data to properly position head 219 over a desired track. Servo data used to identify a head's location over a disc may be recorded onto disc(s) 209, interspersed between user data. Servo data may be read from disc(s) 209 by head 219 as the disc(s) 209 spin and the head 219 position is adjusted. The read servo data may be provided to preamp circuit 218. The preamp circuit 218 may preamplify and filter the readback signals from the transducer head 219, and provide the processed servo data to read/write channel 217. The R/W channel 217 can detect and condition the servo data, including application of automatic gain control (AGC) and conversion of the signals to digital form.

Servo control 220 can process the digitized servo data to generate a current command signal. The command signal may be used to apply the appropriate current to the coil 224 to position the transducer 219 over the disc(s) 209. The servo data may be used to determine a current track location of the head 219, and calculate adjustments to move to a target track, which may be called track seeking Once the head 219 is over a desired track, the servo data may be used to maintain the head's position over the track during read or write operations, which may be called track following.

In certain embodiments, to attain fine position control of the head 219 relative to a selected data track, a head stack assembly (HSA) can include a micro-actuator (µACT) 221 (which may also be referred to as a secondary actuator motor) supported by a load arm. The micro-actuator 221 can include a bipolar piezoelectric transducer that responds to positive voltage inputs by expanding in a predetermined direction, while contracting in the predetermined direction to application of a negative voltage. As the micro-actuator 221 can be affixed to a load arm of a HSA, changes in mechanical position of the micro-actuator relative to the selected data track results in changes in mechanical position of the head 219 relative to the selected data track of the disc 209, thereby facilitating fine position control of the head 219 relative to the selected data track.

Due to various influences, a head 219 may not perfectly follow a target track, which may lead to the described track misregistration (TMR). The servo data may include burst signals, which may be called position error signal (PES) bursts. The PES bursts may be used to determine the PES value, representing an offset between a head's 219 current position and the track center. If a head 219 deviates too far from a desired track center during a write operation, a write fault may be declared and write operations may be suspended to avoid overwriting data on nearby tracks. The distance a head may deviate from the track center may be referred to as a write fault threshold (WFT). In some embodiments, the WFT module 230 may use the PES value of a first track to set a write fault threshold value of a second track. In some embodiments, the WFT module 230 may use the PES value from a first sector on a selected track to set a write fault threshold value of a second sector on the selected track. The first sector and the second sector may be adjacent (i.e. contiguous) sectors on the selected track.

Figure 3A:
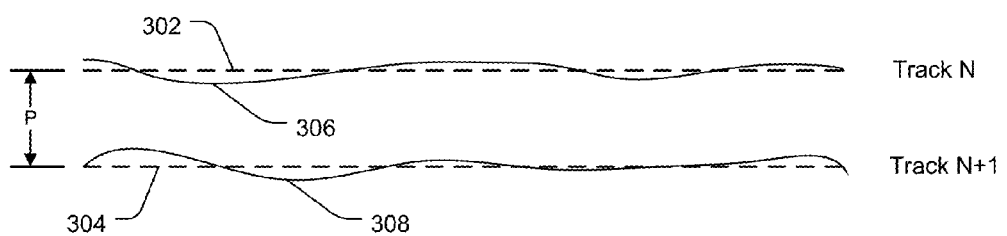
FIGS. 3A and 3B are diagrams of a system having a write fault threshold for a set of tracks, in accordance with certain embodiments of the present disclosure.

FIG. 3A depicts a diagram a system including write fault thresholds, in accordance with certain embodiments of the present disclosure. FIG. 3A shows two example tracks defined on a recording surface of a recording medium, such as disc(s) 209 of FIG. 2. The tracks are identified as track N and track N+1. Each of the tracks may be defined by nominal centerlines 302, 304, depicted as dashed lines. The nominal centerlines 302, 304 may be separated by a nominal track pitch P. Each of the centerlines 302, 304 may be at a fixed radius of the medium and may represent an ideal circular path around the center of the medium. The tracks may vary radially about these centerlines 302, 304 due to a number of repeatable runout (RRO) and non-repeatable runout (NRRO) components. RRO components contribute to head to track misregistration that is the same over each revolution of the medium. NRRO components may vary over each revolution of the medium.

For example, the RRO components may include errors due to the placement of the servo data used by the servo circuit, such as servo control 220 of FIG. 2, to define the tracks. The servo data may define somewhat "wavy" centerlines 306, 308 that deviate from the ideal centerlines 302, 304, and these variations will be experienced over each revolution. In other words, rather than defining perfectly circular track centerlines around the center of the medium, like ideal centerlines 302, 304, the servo data may define centerlines 306, 308 that have small irregularities or aberrations and are therefore not perfectly circular. NRRO components may arise due to a number of factors associated with the recording subsystem (e.g., read head, etc.), the servo-mechanical system (servo, VCM, etc.), or external sources (externally generated vibration, etc.). RRO components, NRRO components, or both, can influence the ability of the servo control circuit, thus causing the write transducer to not be positioned to write data precisely along the centerlines of the tracks defined by the servo data.

When TMR becomes too severe, data written to track N+1 may overwrite data written to track N, to the point where data on track N cannot be recovered. Failure to recover data from a track may be referred to as a hard error. This can be especially prevalent when storage mediums have a high TPI. In order to reduce the likelihood of data loss due to off-track writing, recording systems may use write fault gates during data storage operations. Write fault gates may prevent a transducer from writing data if the transducer has deviated too far from the center of the target track. The distance within which a transducer may write data may be referred to as a write fault threshold (WFT), or write bump control limit (WBCL). In some embodiments, write fault thresholds, write fault gates, or both, may be managed by the servo control system 220, processor 222, AWFT module 230, or a combination thereof.

When a write fault threshold is exceeded, such as may happen if a data storage device is bumped or experiencing vibration conditions, data writing may be suspended to prevent data loss on tracks near the track being written. When data operations are suspended, the write performance of a device as a factor of data recording throughput may be reduced. Accordingly, a write fault threshold may be selected that is low or "tight" enough to protect data integrity, but high or "loose" enough to maintain an acceptable level of recording performance. For example, increasing the WFT for tracks by 1% of track width may reduce the TPIC of a storage medium by 2%. Conversely, reducing the WFT may increase the overall TPIC, but may reduce the data throughput rate.

Figure 3B:
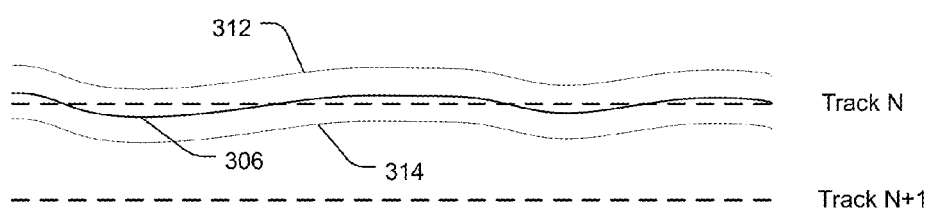

Turning to FIG. 3B, a diagram of a system including write fault thresholds is shown, in accordance with certain embodiments of the present disclosure. Lines 312 and 314 may represent write fault threshold (WFT) values on each side of the servo centerline 306. The lines 312, 314 may represent some percentage of acceptable off-track deviation of the position of the write transducer (e.g. head 219 of FIG. 2) during the writing of data to the target track N. This value can vary, for example depending on whether a system employs shingled recording or non-shingled recording. In some embodiments, the WFT for a track may be on the order of about +/−15% of a total track width value for non-shingled recording. In some embodiments, such as for data writing operations utilizing shingled magnetic recording (SMR), where a track partially overlaps an adjacent track, lower write fault threshold values may be applied than the thresholds applied in non-shingled recording. Any values suitable to meet performance goals can be selected for the WFT values.

If the transducer moves outside of the WFT area, a write fault may be declared and the transducer will not write data. It should be noted that FIGS. 3A and 3B illustrate a single-sided squeeze condition between tracks N and N+1. In many cases, there may also be a double-sided squeeze condition including the simultaneous encroachment of tracks N−1 and N+1 on the track N. These embodiments apply equally well to both cases.

Figure 4A:
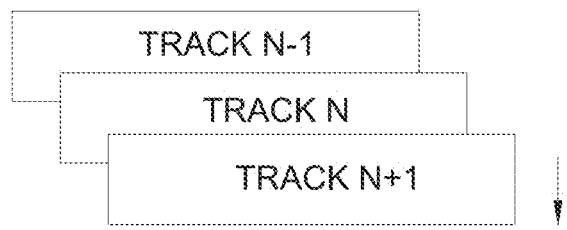
FIGS. 4A and 4B are diagrams of a system having a write fault threshold for a set of tracks, in accordance with certain embodiments of the present disclosure.
Figure 4B:
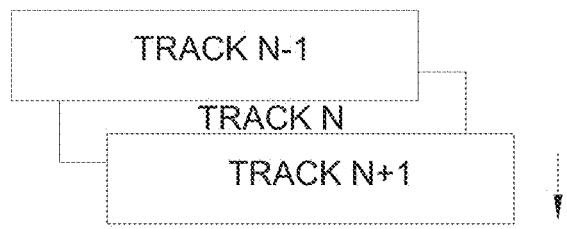

FIGS. 4A and 4B are diagrams of examples of a system having a write fault threshold for a set of tracks, in accordance with certain embodiments of the present disclosure. FIGS. 4A and 4B depict data recording tracks arranged in a shingled manner according to certain embodiments of the present disclosure. In some embodiments, such as with shingled magnetic recording (SMR), each track may partially overlap an adjacent track, and data may only be written in a specified direction (e.g. first track N−1, then track N, then track N+1, etc.). The shingle write direction may be referred to as the "positive" direction, while the opposite writing direction may be referred to as the "negative" direction. It should be understood that the positive direction may be from the inner diameter (ID) to the outer diameter (OD) of the recording medium, or vice versa. The positive direction may even be different per zone or per shingled recording band, for example based on a write head's writing capabilities in different directions at different points over a recording medium.

Referring to FIG. 4A, if it is assumed that writing is performed in the arrow-indicated positive direction in the shingle-write scheme, when writing to track N, adjacent track N−1 may be partially overwritten. Similarly, when writing is performed on track N+1, adjacent track N may be partially overwritten. In contrast to recording methods where each track is written without any intentional overlap, SMR may result in increased recording density due to a higher tracks per inch (TPI) characteristic in a radial direction of a storage medium.

As illustrated in FIG. 4B, after writing on track N, if track N−1 is written in the negative direction of the positive shingled recording direction, track N may become unreadable due to Adjacent Track Interference (ATI), or being partially overwritten by both adjacent tracks (i.e. track N−1 and track N+1). Therefore, it may be advantageous to follow a constraint that track N−1 should not be written after track N is written. Accordingly, writing or modifying data on track N−1 after track N is recorded, or on track N after track N+1 is recorded, may require a different writing strategy than with non-shingled tracks, which can simply be overwritten at any time. In some embodiments, data may be written to each track in a set of shingled tracks in a sequential order having a first writing direction.

Figure 5:
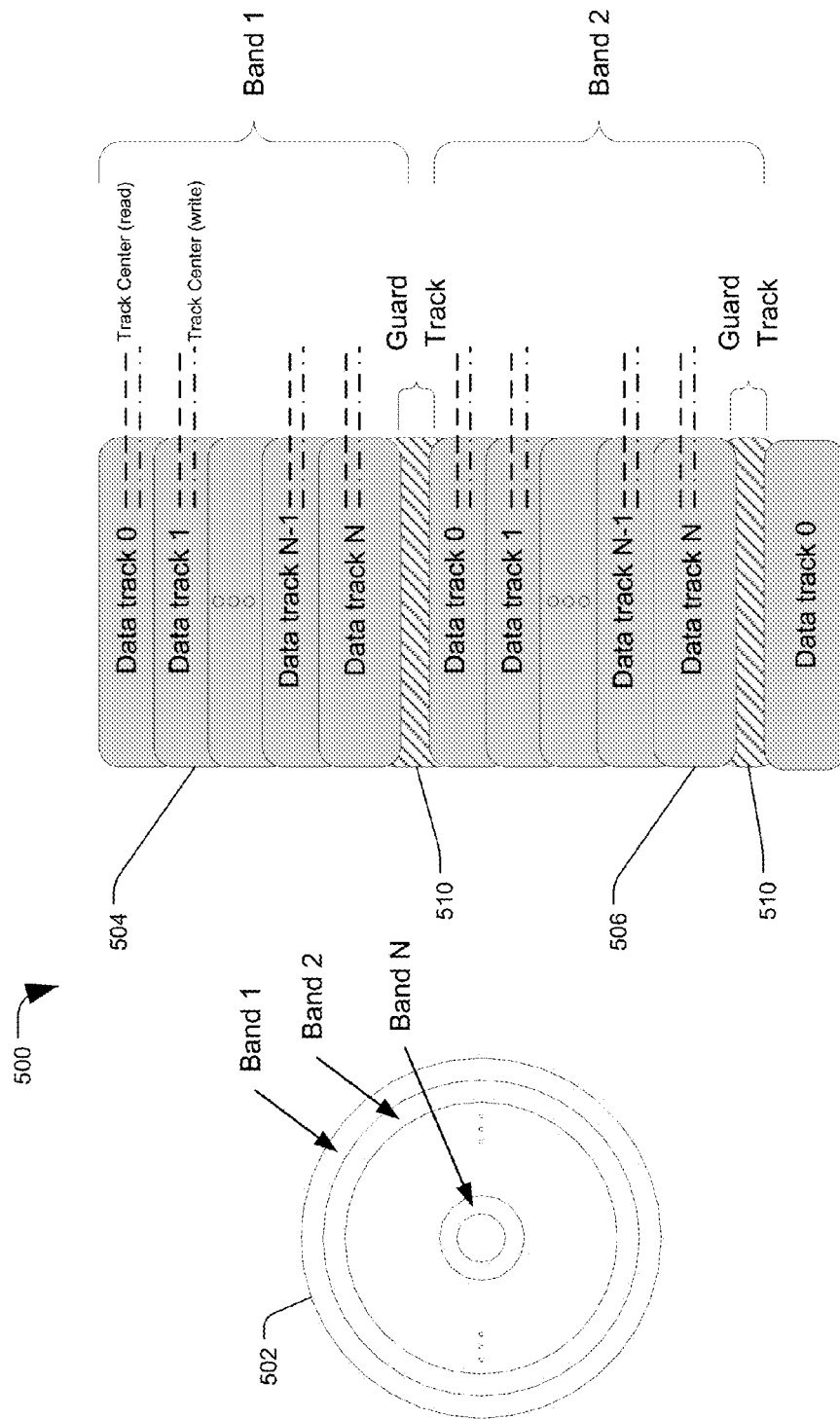
FIG. 5 is a diagram of a system having a write fault threshold for a set of tracks, in accordance with certain embodiments of the present disclosure.

FIG. 5 is a diagram of a system having a write fault threshold for a set of tracks, generally designated 500, in accordance with certain embodiments of the present disclosure. Due to the track write overlap of SMR, writing a given track N−1 after track N has been written may require rewriting all shingled tracks that following track N−1 (i.e. track N, track N+1, track N+2, etc.). In order to accomplish this realistically, a set of shingled tracks may be grouped into a "band," such that writing the last track of a given band X does not require rewriting any of the following tracks in bands X+1, X+2, X+3 and so on. Rotating disc media 502 may be divided into a plurality of bands (e.g. Band 1, Band 2, etc.), and each band may contain a plurality of shingled data tracks, in which at least one data track partially overlaps another data track in a shingled manner.

Separating bands so that rewriting one does not require rewriting tracks outside the band can be accomplished by locating the tracks such that the last track of a band is not trimmed or overlapped by a track that can be written. Bands may have a number of shingled tracks 504, such as tracks 0 through N−1 of FIG. 5, which are partially overlapped by adjacent tracks. Bands may end with an unshingled "fat" track 506, such as track N of FIG. 5, which does not have a reduced read track pitch relative to its write track pitch because it is not partially overlapped by a track that can be written to. Because the last track 506 is not overlapped by a writable track, the band can be rewritten without affecting tracks outside the band. The last track 506 of each band may be followed by a "not-to-be-written" track, preventing the last track from being partially overwritten. Not-to-be-written tracks may be referred to as "guard tracks" 510, as they provide band boundaries to separate writable tracks of different bands and guard the last track 506 of a band from being trimmed by or trimming tracks outside the band. When track 0 needs to be re-written, tracks t0 to the fat track N 506 can be rewritten, while tracks in other bands are not affected. In some embodiments, a single guard track may be used, while in some embodiments multiple tracks may be designated as "not to be written" between bands to provide a larger buffer against ATI. A guard track may also be referred to as a guard band or isolation track.

Writing to a shingled band may include writing a first track, then writing a next adjacent track, and so on until writing the "fat" track at the end of the band opposite to the first track. If data within the band is to be updated or changed, a read-modify-write (RMW) operation, sometimes call a banded rewrite operation (BRO) may be performed. A BRO may include reading the data from the band into a RAM memory or some other "workspace" memory, modifying the read data with the new data to be written, and then writing the modified data back to the original band or to another band. For example, if new data is to be written to track six of a fifty-track band, the entire band may be read, the data for track six may be modified, and the modified band data may be re-written. A partial BRO may include reading a modifying a portion of a band, while maintaining the shingled write order. For example, if new data is to be written to track twenty of a fifty-track band, a partial BRO may include reading tracks twenty through fifty, modifying the data for track twenty, and rewriting tracks twenty through fifty. The data of tracks one through nineteen may not need to be modified.

Figure 6A:
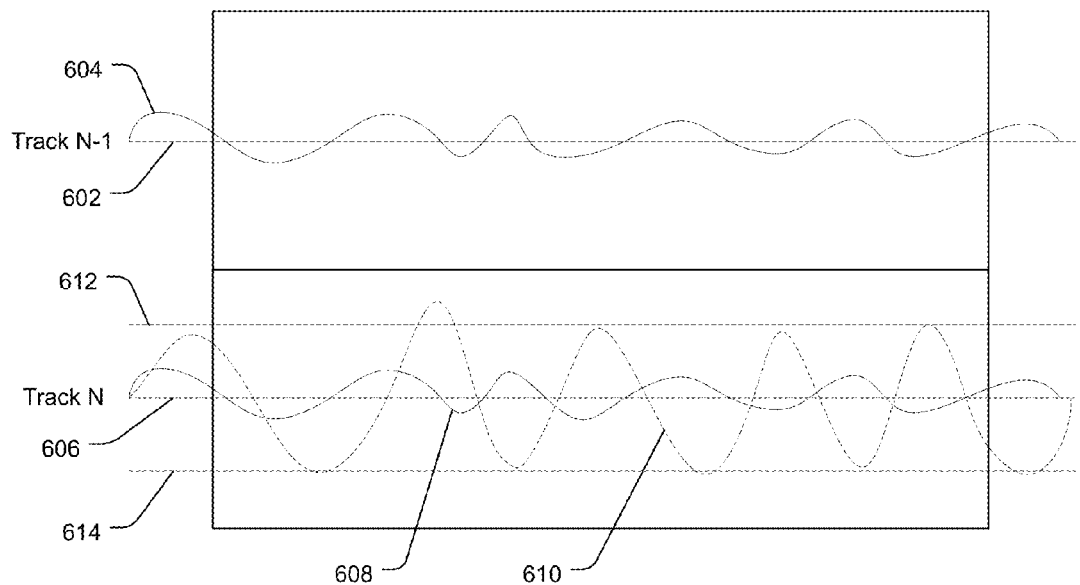
FIGS. 6A and 6B are diagrams of systems having a write fault threshold for a set of tracks, in accordance with certain embodiments of the present disclosure.
Figure 6B:
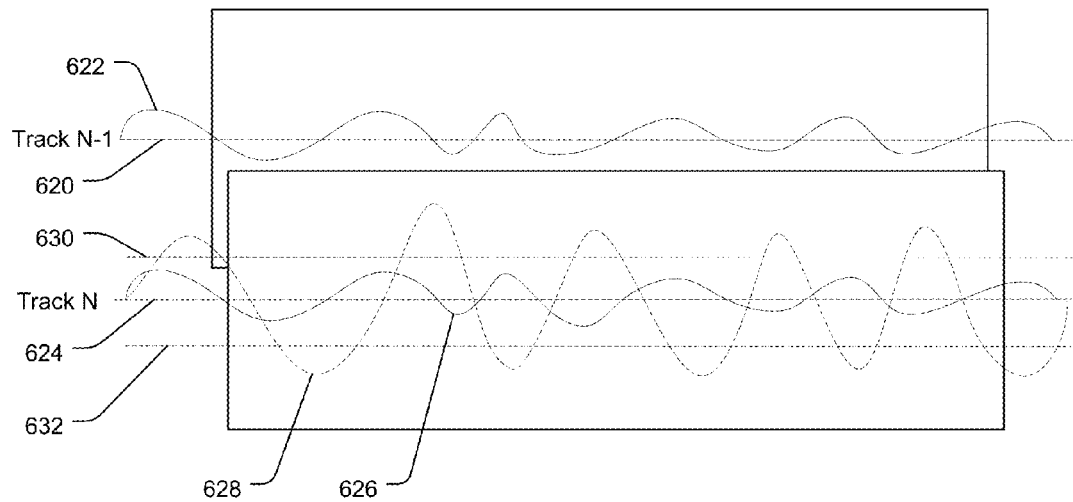

FIGS. 6A and 6B depict example write fault thresholds, in accordance with certain embodiments of the present disclosure. For simplicity, the example tracks are depicted having straight write center lines, and corresponding straight write fault threshold lines, without depicting RRO effects. In practice, write centers and write fault gates or thresholds may be somewhat "wavy" as depicted in FIGS. 3A and 3B.

Turning now to FIG. 6A, a diagram of write fault thresholds according to certain embodiments is shown. In some embodiments, the tracks of FIG. 6A may be an example of non-shingled recording tracks. Track N−1 may have a write center line 602, and data 604 written to track N−1 during normal operating conditions (e.g. no vibrations or other affects that may cause a transducer head to waver erratically). Adjacent to track N−1 may be track N, having a write center line 606. Track N depicts a write path 608 during normal operating conditions, and a write path 610 during conditions which may result in track misregistration (TMR). In order to prevent TMR from causing data recorded to tracks adjacent to track N to become difficult or impossible to read, WFTs may be used to control data recording operations to track N. Write fault thresholds 612 and 614 may prevent writing if the write head deviates from center line 606 by more than a set amount, e.g. 15% of the track pitch for track N. In the depicted example, the write transducer may exceed the write fault thresholds 612 and 614 only infrequently. Write fault thresholds 612 and 614 may provide adequate data integrity while maintaining satisfactory write throughput in non-shingled recording.

FIG. 6B depicts certain embodiments of write fault thresholds. The tracks of FIG. 6B may be configured for shingled recording, according to some embodiments. In the embodiment of FIG. 6B, the shingled recording direction may include recording track N−1, followed by track N. Subsequent tracks N+1, N+2, etc. may be written to after track N. Track N−1 may have a write center 620, and data 622 recorded under normal write operating conditions. Track N may have a centerline 624, and data written to track N may partially overlap track N−1. A write path 626 for track N under normal operating conditions is shown. In addition, a write path 628 under conditions which may cause TMR is shown, such as if the data storage device is jostled.

Due to the partially overlapped nature of shingled recording and the corresponding increase in tracks per inch (TPI) on the disc, a lower amount of TMR can cause data loss or corruption. Accordingly, the write fault thresholds used in some embodiments of non-shingled recording (e.g. 15% of track pitch per track) may be too loose, and may allow adjacent track interference if used in SMR. In order to protect data integrity of shingled tracks, in some embodiments write fault thresholds 630 and 632 may be used when writing to track N, which thresholds may be lower than those used in non-shingled recording (e.g. 8% of track pitch per track). However, in some embodiments, tight write fault thresholds may result in the write fault thresholds 630 and 632 being exceeded frequently during device operation, which may negatively impact write throughput.

Accordingly, data integrity and write throughput may be maintained without compromising areal density capability (ADC) by employing a shared write fault threshold budget for contiguous tracks. Rather than each track having its own set write fault thresholds, which may either require lower TPI to allow looser WFT values, or reduce a write throughput performance with tighter WFT values, tracks may share a WFT budget. The shared budget may be larger than necessary for either track independently, but may be lower than two sufficiently loose independent WFT values. For example, a WFT value of 14% may be desirable for a track in order to maintain a consistent write throughput, even if that amount of off-track deviation is not frequently needed. However, assigning that large of a WFT for each track may require enough space for 28% off-track deviation between a pair of tracks. However, if the tracks share a WFT budget of, e.g. 18%, it may allow either track to have significant off-track deviation without triggering a write fault, while maintaining a higher TPI. It is unlikely that both adjacent tracks will have enough off-track deviation into the area between tracks over the same length of track to require more than the shared budget, so write throughput may remain high. While an example of shingled tracks is provided, the same benefit may be achieved in non-shingled recording schemes.

Figure 7:
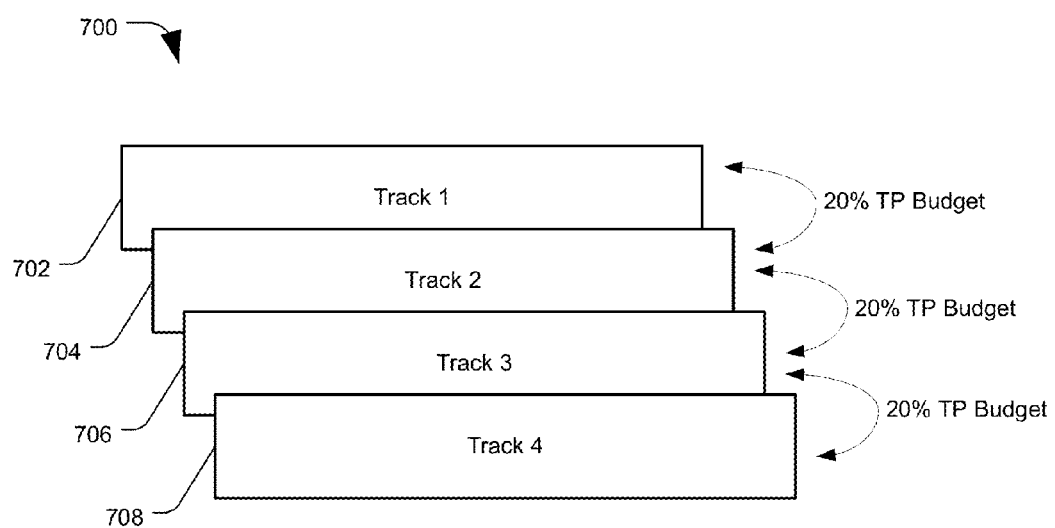
FIG. 7 is a diagram of a system having a write fault threshold for a set of tracks, in accordance with certain embodiments of the present disclosure.

FIG. 7 is a diagram of a system having a write fault threshold for a set of tracks, generally designated 700, in accordance with certain embodiments of the present disclosure. Specifically, FIG. 7 depicts four contiguous data tracks, track 1 702, track 2 704, track 3 706, and track 4 708. As discussed, rather than having a set write fault threshold for each track, a data storage device may be configured to employ a shared WFT budget between contiguous tracks. For example, track N and track N+1 may together have a total WFT budget of 20% of track pitch (TP), so that an off-track value of the data written to track n may reduce the remaining off-track space available to track N+1. Similarly, the amount of off-track value when writing track N+1 may influence the amount available when writing track N+2, and so on.

In some embodiments, tracks 1 through 4 of FIG. 7 may be tracks of a shingled recording band, and may be written to in ascending numerical order. In some embodiments, consecutive tracks may share a total WFT "budget," rather than having discrete WFTs per track. For example, track 1 702 may be written first, and a position error signal (PES) value may be determined for data written to track 1 during the write operation, or following the write operation. The determined PES value may be used to determine a WFT value for track 2 704 when writing to track 2, such as by reducing the total WFT budget available for track 1 702 and track 2 704. As described herein, positive off-track or PES values represent data that is written off-track towards the next adjacent track in the shingle write direction, while a negative off-track of PES values represent data written off-track towards a previous adjacent track opposite to the shingle write direction.

Assume a pair of tracks share a WFT budget of 20% TP. The WFT budget may be shared for the space between two adjacent tracks. Data may be written to track 1 702, and a PES value of 8% may be determined, indicating the data of track 1 is offset by 8% of a track pitch from an ideal centerline in the direction of track 2 704. Accordingly, the WFT module may set the WFT for track 2 704 as 8%−20%=−12%. When writing data to track 2 704, the offset position of the transducer may be monitored, and if it exceeds 12% TP in the direction of track 1 702, a write fault may be declared and write operations suspended. Similarly, a WFT budget may be shared between track 2 704 and track 3 706. If the PES value for data written to track 2 704 turns out to be −4% TP (i.e. offset from track center in the direction of track 1 702), then the full budget of 20% TP may be available for track 3 706, because no data is encroaching on the space between track 2 and track 3. Similarly, track 3

706 and track 4 708 may share a WFT budget, and so on. If data written to track 3 706 has a PES value of 13%, track 4 may have a WFT value of 7% TP available. By having a shared WFT budget for a set of tracks, a total amount of recording medium surface area dedicated to WFT buffers between tracks may be reduced and the areal density capability (ADC) of the memory improved. In some embodiments, performance of a data storage device (DSD) may be improved by maintaining an ADC while improving a write throughput in vibration conditions, by having larger potential WFT buffers available to each track. Other embodiments are also possible.

Figure 8:
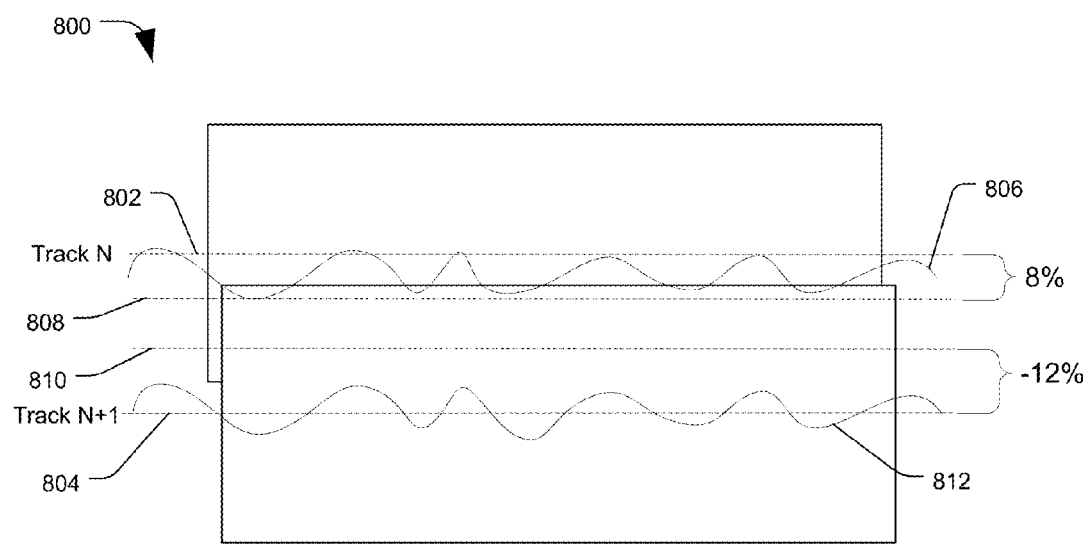
FIG. 8 is a diagram of a system having a write fault threshold for a set of tracks, in accordance with certain embodiments of the present disclosure.

FIG. 8 is a diagram of a system having a write fault threshold for a set of tracks, generally designated 800, in accordance with certain embodiments of the present disclosure. Contiguous shingled tracks N and N+1 are depicted. Track N may include an ideal write center line 802, while track N+1 may have a center line 804. Data 806 may be written to track N, and it may be determined, via reading servo burst patterns written to track 1, that the transducer head was off-center while writing the data 806. Line 808 may represent the PES value for the data 806, with a PES value of 8% TP. If track N and track N+1 share a WFT budget of 20% TP, then the DSD may set a WFT value of −12% for track N+1, as indicated by line 810. When writing data 812 to track N+1, the transducer head may be offset by up to −12% TP, shown by line 810, before triggering a write fault.

As can be appreciated by one having ordinary skill in the art, the 20% WFT budget may represent a total track pitch percentage amount that data written to both tracks N and N+1 may be offset in the range between tracks N and N+1. Conversely, the positive and negative values for the PES values and WFT for the tracks may indicate a direction of offset, rather than a positive or negative amount of offset. In the depicted example, +8% PES value track N and −12% WFT for track N+1 would reach the total 20% WFT budget, even though +8% and −12% do not add up to 20%. Accordingly, the WFT set for track N+1 based on the PES value of track N may be expressed as a positive value instead of a negative value without changing the meaning as described herein.

Figure 9:
FIG. 9 is a diagram of a system having a write fault threshold for a set of tracks, in accordance with certain embodiments of the present disclosure.

FIG. 9 is a diagram of a system having a write fault threshold for a set of tracks, generally designated 900, in accordance with certain embodiments of the present disclosure. Contiguous tracks N and N+1 are depicted. In the depicted embodiment, the PES value of track N may be monitored on a sector-by-sector basis, and accordingly the WFT for track N+1 may be set on a sector-by-sector basis. The sectors of each track may align radially on the surface of the data storage medium, so that the PES value for a given sector may be used to set the WFT for a radially-aligned sector on the next contiguous track. In the example of FIG. 9, the WFT budget may be set to 18% TP. The WFT budget may be stored in a memory accessible by the servo control system. In some embodiments, the WFT budget may be the same across the entire storage medium, or it may be different per zone of the disc (where a zone is defined as a number of contiguous data tracks on a disc, wherein the tracks within a zone contain the same number of data sectors), per band, or based on other criteria.

While writing data to track N, the servo control system may monitor the PES value to determine an offset of the transducer head, and accordingly and offset of the data being recorded by the head. In some embodiments, the PES values may be stored to a memory, and accessed when writing track N+1 to determine corresponding WFT values for track N+1. In some embodiments, the PES values may be used to calculate the WFT values for track N+1, and those WFT values may be stored and accessed when writing to track N+1. Other embodiments are also possible.

If the WFT budget is 18% TP, and the servo system determines that the PES value for sector 1 of track N is 4%, then the WFT for sector 1 of track N+1 may be set to −14% TP. The PES value for sector 2 of track N may be determined to be 8%, and therefore the WFT for sector 2 of track N may be set to −10%. If the PES value of sector 3 of track N is determined to be −2%, indicating the data was offset in the direction of track N−1, away from track N+1, the offset may not "consume" any of the WFT budget shared by tracks N and N+1. Accordingly, the WFT for sector 3 of track N+1 be set as the full WFT budget of −18%. In some embodiments, a negative PES value for track N may be added to the total offset budget of track N+1. For example, if the PES value of sector 3 of track N is −2%, the WFT available for sector 3 of track N+1 may be set to 20% instead of 18%.

In some embodiments, additional write fault constraints may be imposed for data writes. For example, various write fault constraints may be monitored, determined, or implemented using a write fault threshold module incorporated into a servo control loop of a data storage device. In some embodiments, in addition to the shared WFT budget for off track writing between contiguous tracks, the servo system may impose an additional maximum WFT when writing to a track that is lower than the total WFT budget. For example, the shared WFT budget may be 18% TP, while the maximum WFT may be 14%. If data written to track N has a PES value of less than 4% TP, a maximum WFT of −14% may be imposed for track N+1, even if it would not exceed the total WFT budget. Similarly, when writing to track N, a maximum WFT of 14% may be imposed instead of the 18% total WFT budget, and track N+1 would have at least a −4% WFT remaining based on the WFT budget. A maximum WFT may be useful to retain a sufficient budget for writing to track N+1, or because writing too far off track center may hinder read operations. The maximum WFT amount may be greater than half of the total WFT budget.

In some embodiments, an additional WFT may be set for off-track writing in the positive shingled writing direction. For example, if tracks are written in an order of N−1, N, N+1, etc., then when writing to track N, off-track writing in the direction of track N+1 may be subject to an additional WFT. This may be referred to as a band rewrite operation (BRO) WFT, for write offsets in the shingled write direction. The BRO may be set at a value such as 10% TP.

In some embodiments, a first track WFT may be selected as the WFT in the direction of a previous track written at an earlier time. For example, when writing to a first target track, the data storage device may not have a record of the PES values of the previous track, and accordingly the system may not set the current track's WFT based on a shared WFT budget. A WFT such as 10% track pitch may be selected as a default. In some embodiments, the first track WFT may be set as the shared WFT budget reduced by the BRO WFT limit. For example, if the BRO WFT is 10%, and the total WFT budget is 18%, the first track WFT may be set as 8%. In some embodiments, the first track WFT may be different depending on whether the target track is the first track in a band (e.g. and therefore contiguous to a guard track storing no data), or a track in the middle of a band. If the target track is the first track in a band, the first track WFT may be set, e.g. to the maximum WFT. However, if the target track is not the first track in a band, it may be contiguous to previously written data with an unknown PES value, and so a lower first track WFT may be selected.

Figure 10:
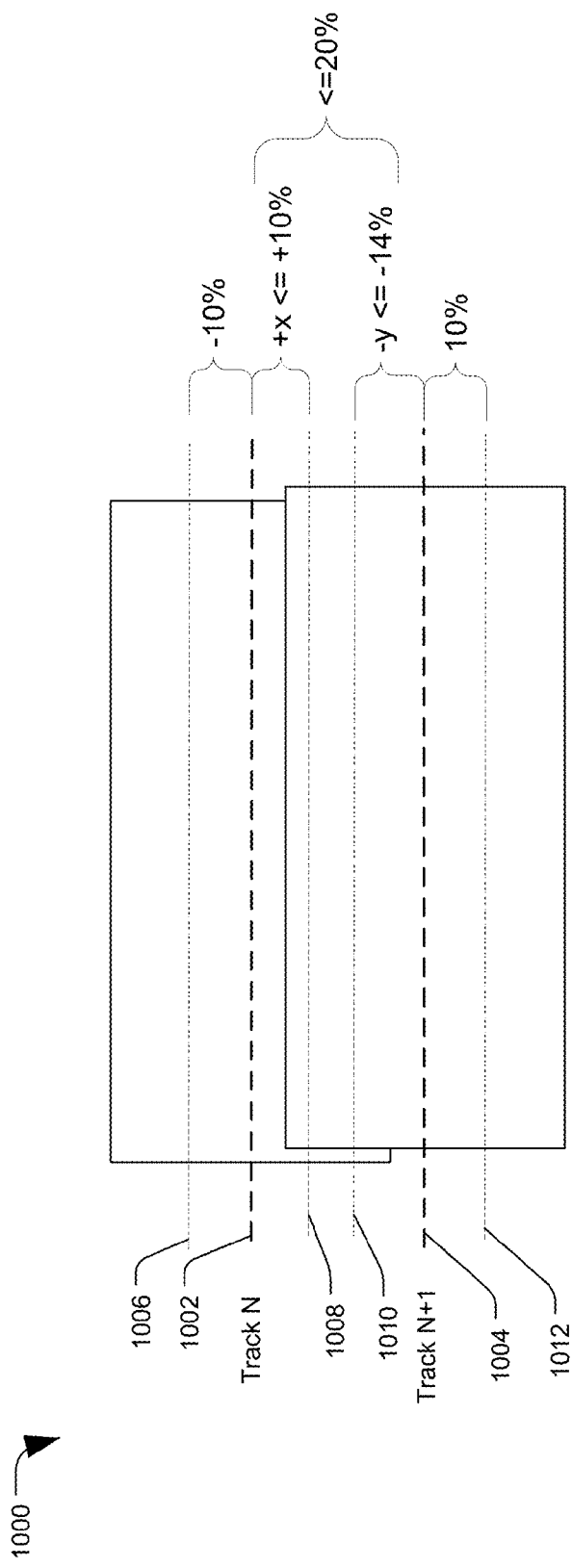
FIG. 10 is a diagram of a system having a write fault threshold for a set of tracks, in accordance with certain embodiments of the present disclosure.

FIG. 10 is a diagram of a system having a write fault threshold for a set of tracks, generally designated 1000, in accordance with certain embodiments of the present disclosure. Contiguous tracks N 1002 and N+1 1004 are depicted. Track N 1002 may be the first target track of a write operation, and may have a first track WFT 1006, depicted as −10% TP off the track center 1002. In some embodiments, the first track WFT 1006 may be different depending on whether track N 1002 is the first track in a band. For example, if track N 1002 is the first track of the band, the first track WFT 1006 may be set to a maximum WFT for a track; e.g. −14%. If track N is not the first track in a band, the first track WFT may be set to a lower number, such as the BRO WFT amount, or the difference between the WFT budget and a BRO WFT amount, or some other amount.

Track N may also have a WFT set in the positive shingle write direction, as represented by line 1008. WFT 1008 may be set to a default BRO WFT such as 10% TP, a maximum WFT amount such as 14% TP, or up to a shared WFT budget such as 20% TP. In the depicted embodiment, the WFT 1008 is shown as 10%, corresponding to an example value for a BRO WFT.

When writing data to track N, a servo system may monitor the position error signal (PES) value corresponding to the transducer's location. If the PES exceeds the WFT 1006 in the negative direction, or the WFT 1008 in the positive writing direction, write operations may be suspended. The PES value may be stored (e.g. in a RAM memory accessible to the servo control system) or used to select a WFT for the next contiguous track, track N+1 1004, based on a WFT budget. In some embodiments, the PES value, and the WFT for track N+1, may be set on a sector-by-sector basis.

Track N+1 may have a WFT 1010 in the negative writing direction. WFT 1010 may be selected based on a shared WFT budget (e.g. 20% in the depicted embodiment) and the PES value for track N. For example, if the data written to track N has a PES value of 8%, the WFT 1010 for track N+1 may be set to −12%. The WFT 1010 may have a maximum WFT amount, such as −14%, which may not be exceeded even if the PES value for track N is less than or equal to 6%. The combined off-track percentage values for track N and track N+1 may selected not to exceed the shared 20% WFT budget. In some embodiments, if track N+1 is the first target track in a write operation, the WFT 1010 may be set to a first track WFT value of, e.g. −10%, and not be selected based on a PES value for track N. Other embodiments are also possible.

Track N+1 may also have a WFT 1012 in the positive shingled recording direction. The WFT may be set to a default BRO WFT amount, for example 10%. The WFT 1012 may be different depending on if track N+1 is the last track in a band. For example, if track N+1 is not the last track, the BRO WFT amount of 10% may be enforced. However, if track N+1 is the last track and is not followed by a shingled data track, a higher WFT may be employed, such as equal to the maximum WFT of 14%. Other embodiments are also possible.

When writing data to track N+1 1004, a servo system may monitor the PES value corresponding to the transducer's location. If the PES exceeds the WFT 1010 in the negative direction, or the WFT 1012 in the positive writing direction, write operations may be suspended. The PES value may be stored or used to select a WFT for the next contiguous track, track N+2, based on a WFT budget. The process may repeat for any number of contiguous tracks.

Figure 11:
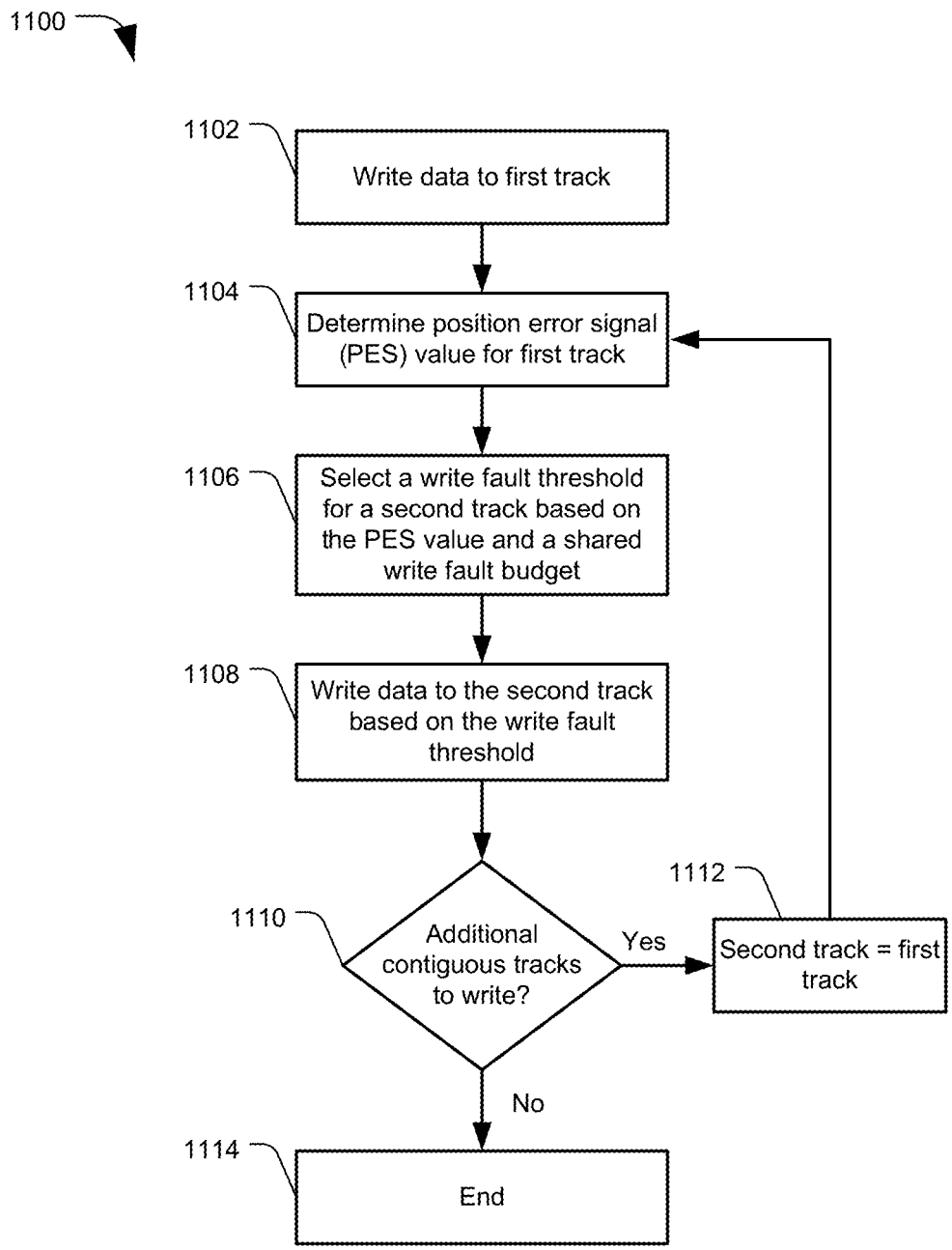
FIG. 11 is a flowchart of a method employing a write fault threshold for a set of tracks, in accordance with certain embodiments of the present disclosure.

FIG. 11 is a flowchart of an example method 1100 for applying a write fault threshold for a set of tracks, in accordance with certain embodiments of the present disclosure. Method 1100 may include writing data to a first track, at 1102. For example, a data storage device (DSD) may receive a write command from a host device directing the DSD to record specified data to a storage medium. In some embodiments, the data may be recorded to one or more tracks of a shingled storage band.

Method 1100 may include determining a position error signal (PES) value for the first track. For example, the DSD may use a servo control system to monitor a position of a write head as data is recorded to the target data track, such as based on servo burst patterns recorded to the storage medium. The DSD may determine maximum allowable PES values in both a positive direction and a negative direction, or on one side of the track center and on the opposite side of the track center. For example, if the target track is the first track written during the write operation, the write fault threshold (WFT) PES value in the negative direction may be set to a maximum WFT (e.g. −14%), set to a BRO write fault threshold of, e.g. −10% TP, set to a value equal to a shared WFT budget reduced by the BRO WFT (e.g. 18%−10%=8% WFT), or the WFT may be set to another value. Similarly, the WFT in the positive direction may be the BRO WFT (e.g. 10% TP), or may only be limited by a shared WFT budget (e.g. 18% or 20%). If the write head moves beyond the maximum allowable PES values in either direction, a write fault may be declared and write operations may be suspended. The PES values of the write head may be determined on a sector-by-sector basis of the target track.

Method 1100 may include selecting a write fault threshold for a second track based on the PES value determined for the first track and a shared WFT budget. The second track may immediately follow the first track in a positive direction. In some embodiments, the first track and the second track may be contiguous tracks in a shingled band, and writing to the second track may partially overwrite the first track. The WFT for the second track may be selected on a sector-by-sector basis, corresponding to a sector-by-sector PES value determined for the first track. The WFT for the second track may only limit the PES value for the second track in the negative direction; e.g. toward the first track relative to the center line of the second track. A second WFT for the second track in the positive direction may also be imposed; e.g. a BRO WFT, a maximum WFT amount, or some other value.

For example, if the first track and the second track share a WFT budget of 20% TP, and the first sector of the first track had a PES value of 8%, the WFT for the first sector of the second track may be set to −12%, based on an equation such as [First track PES value]−[shared WFT budget]=WFT for second track; e.g. 8%−20%=−12%. In some embodiments, if the WFT for the second track may be limited by a maximum WFT value. In some embodiments, if the first track has a negative PES value (e.g. in the direction away from the second track), the WFT available to the second track may become greater than the WFT budget; e.g. −2%−20%=−22% WFT. In some embodiments, a maximum WFT less than the WFT budget may be imposed. For example, with a shared WFT budget of 20%, a maximum WFT of −12% may be imposed on the second track, even if the first track PES value was <8%.

Method 1100 may include writing data to the second track based on the write fault threshold, at 1108. Writing the data may include monitoring the PES value of the write head while writing to the second track, and suspending write operations if the PES value exceeds the write fault thresholds set for the positive direction or the negative direction.

Method 1100 may include determining if there are additional contiguous tracks to write following the second track, at 1110. If there are, the second track may be treated as the first track, at 1112, and the method may continue at 1104 with determining the PES values and at 1106 with selecting a WFT value for the next track based on the PES values of the second track. If there are no additional contiguous tracks after the second track, at 1110, the method may end at 1114.

Figure 12:
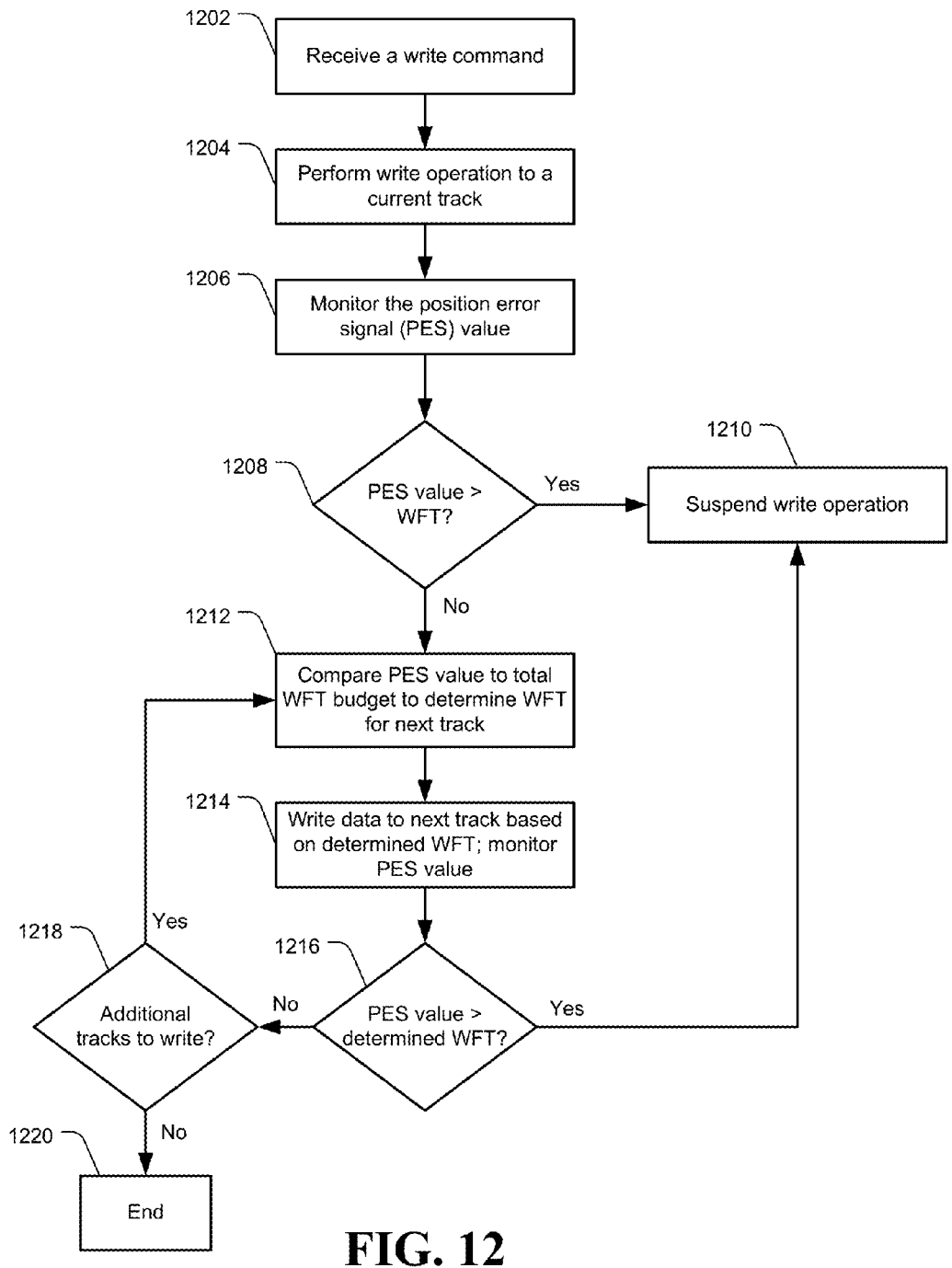
FIG. 12 is a flowchart of a method employing a write fault threshold for a set of tracks, in accordance with certain embodiments of the present disclosure.

FIG. 12 is a flowchart of an example method 1200 for applying a write fault threshold for a set of tracks, in accordance with certain embodiments of the present disclosure. FIG. 12 may depict a write operation to contiguous tracks. The method 1200 may include receiving a write command, at 1202, such as at a data storage device (DSD) from a host device. The DSD may perform a write operation to a current or target track, at 1204. The method may include monitoring a position error signal (PES) value when writing to the target track, at 1206.

Method 1200 may include comparing the PES value against one or more write fault thresholds (WFTs), at 1208. For example, a first WFT value may be applied in a negative direction (e.g. the write head deviating from the target track center away from the next contiguous track to write), and a second WFT value may be applied in a positive direction (e.g. the write head deviating from the target track center towards the next contiguous track to write). If the monitored PES value exceeds a WFT, at 1208, the DSD may suspend write operations at 1210.

If the PES value does not exceed a WFT, at 1208, the method may include comparing the PES value to a total WFT budget shared between a set of tracks in order to determine a WFT for the next track. In some embodiments, the PES value may be determined for each sector of the target track as it is written, and the WFT is calculated and stored for use when writing to the corresponding sector of the next track. In some embodiments, the PES values for the first track are stored, and the stored values are used to compute the WFT value when writing to the next track.

As discussed, the target track and the next track may share a total WFT budget. The WFT budget available to the next track may be reduced by an amount of off-track deviation (the PES value) when writing to the target track. In some embodiments, the WFT budget may only be reduce for positive PES values (e.g. in the direction of the next track). The WFT value for the next track may also be limited by additional constraints, such as a maximum WFT lower than the WFT budget, in instances where the WFT budget is not greatly reduced by the PES value of the first track. The shared WFT budget may only apply for off-track writing to the next track in the negative direction (e.g. toward the first target track), and off-track writing in the positive direction may be restricted by a second WFT constraint. For example, in the negative direction the next track may have a WFT that is the lower of [a 20% shared budget reduced by the PES value of the first track], and [a maximum WFT of 14%]. In the positive direction, the next track may have a WFT set to 10%. Other embodiments are also possible.

Method 1200 may include writing data to the next track based on the determined one or more WFTs, and monitoring the PES value during the write operation, at 1214. If the PES value exceeds the one or more selected WFT values, at 1216, the write operation may be suspended, at 1210. If the PES value does not exceed the one or more WFTs, at 1216, the method may determine whether there are additional contiguous tracks to write, at 1218. If there are, the method may return to comparing the PES value to a shared WFT budget to determine the WFT for the next track, at 1212. If there are no additional tracks to write, at 1218, the method may end at 1220.

By employing a shared WFT budget for set of tracks, device performance may be improved. Shared WFT budgets may provide substantial flexibility for off-track writing without reducing the areal density capabilities of a storage medium, or allowing increased tracks per inch (TPI) without compromising write throughput due to excessive write faults.

Figure 13:
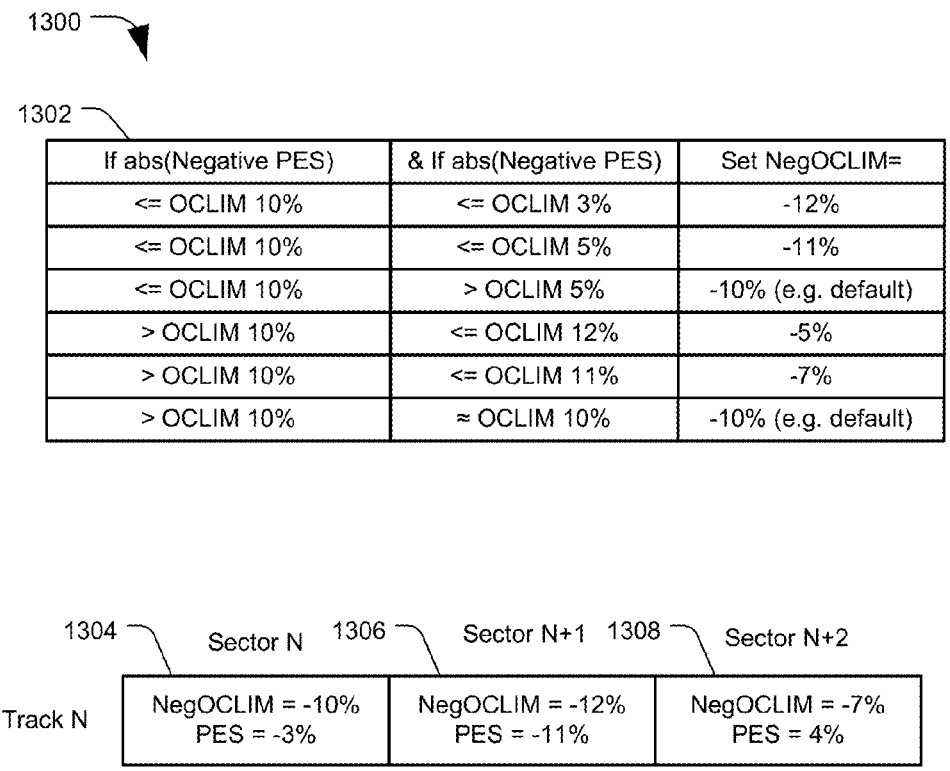
FIG. 13 is a diagram of a system having a variable write fault threshold, in accordance with certain embodiments of the present disclosure.

FIG. 13 is a diagram of a system having dependent write fault thresholds, generally designated 1300, in accordance with certain embodiments of the present disclosure. System 1300 may be implemented by system 100, 200, or any of the other systems and processes described herein. System 1300 may include a decision system 1302, which may be implemented as a logic circuit or firmware in a controller accessible memory. The decision system 1302 can define multiple thresholds to implement a variable write threshold system, and can define the conditions for when different write fault thresholds may be applied.

For example, if an absolute value (abs) of a negative PES for a selected sector of a specific track is less than or equal to 10% of the track pitch, the decision system 1302 may determine if the abs of the negative PES is also less than or equal to 3% of the track pitch. When those conditions occur, the system 1300 may set a write fault threshold of 12% in the negative direction for another sector of the specific track. The another sector may be an adjacent sector to the selected sector, or could be a non-adjacent sector of the specific track. That is, this decision system 1302 may be applied every sector, or may be applied for a selected number of contiguous sectors or periodically.

In another example, as depicted in FIG. 13, a first sector 1304 may be written using a default write fault threshold (e.g. −10% in the negative direction) and the PES of the first sector may be determined to be −3%. Thus, when the system 1300 applies decision system 1302, it may set a write fault threshold of −12% in the negative direction for the next adjacent sector (e.g. N+1) 1306. Continuing, if the PES of the second sector (N+1) 1306 is −11%, the decision system 1302 may set a write fault threshold of −7% in the negative direction for the next adjacent sector (e.g. N+2) 1308. In some embodiments, a write fault threshold in the positive direction may be set to a fixed value (e.g. 10% in the shingled write direction, such as from OD to ID). In other embodiments, the write fault thresholds in the negative direction may be set to a fixed value while the write fault thresholds in the positive direction are variable. Further, a system could implement variable write fault thresholds in both directions.

Figure 14:
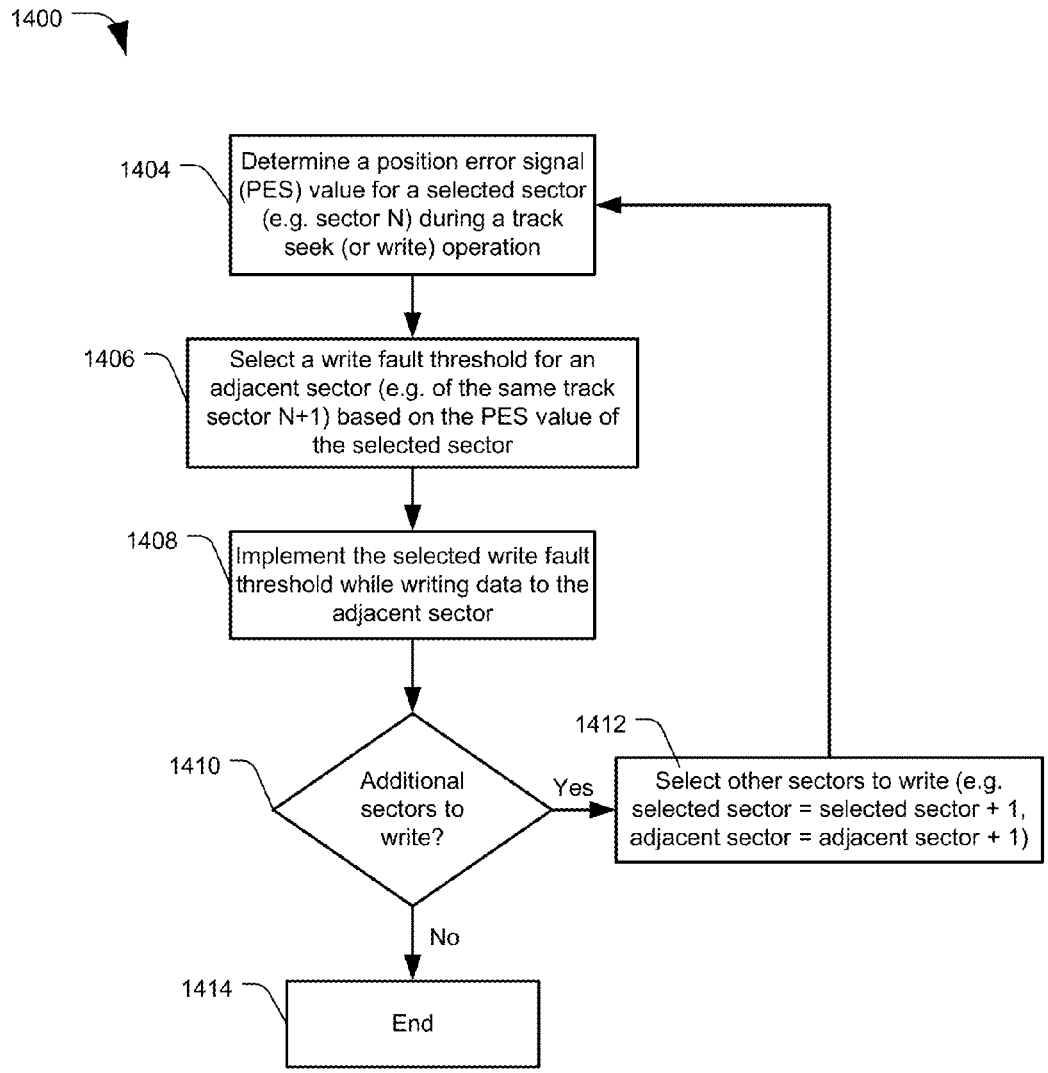
FIG. 14 is a flowchart of a method employing a variable write fault threshold, in accordance with certain embodiments of the present disclosure.

FIG. 14 is a flowchart of an example method 1400 for applying a variable write fault threshold, in accordance with certain embodiments of the present disclosure. Method 1400 may be implemented by system 100, system 200, or any of the other systems described herein. Method 1400 may include determining a PES value for a selected sector during a track seek or write operation, at 1404. For example, a data storage device (DSD) may receive a write command from a host device directing the DSD to record specified data to a storage medium. The DSD may perform a seek operation to move a recording head to a designated location to store the specific data and then perform a write operation at the designated location to store the specific data. During the seek operation or during the write operation, the DSD may detect a PES value of a selected sector. In some embodiments, the data may be recorded to one or more tracks of a shingled storage band. For example, the DSD may use a servo control system to monitor a position of a write head relative to a selected sector, such as based on servo burst patterns on the storage medium.

The DSD may then determine a write fault threshold (WFT) for an adjacent sector to the selected sector based on the PES value corresponding to the selected sector, at 1406. The adjacent sector may be an adjacent sector in an adjacent track, or may be an adjacent sector in the same track as the selected sector. The WFT may be determined for one side of the adjacent sector, or both sides of the adjacent sector. For example, the decision system 602, process 800, or a similar system can be used to determine a WFT for an adjacent sector. In some embodiments, a positive direction of a WFT may be a preset fixed value where a negative direction of a WFT may be variable via the method 1400. If the write head moves beyond the WFT in either direction, a write fault may be declared and write operations may be suspended.

Method 1400 may also include writing data to the adjacent sector based on the determined write fault threshold, at 1408. Writing the data may include monitoring the PES value of the write head while writing to the adjacent sector, and suspending write operations if the PES value exceeds the write fault thresholds set for the positive direction or the negative direction. In some embodiments, one of either the positive direction or negative direction may have a pre-defined and non-variable WFT, and the opposite direction has a variable WFT.

Further, Method 1400 may include determining if there are additional sectors to write following the adjacent sector, at 1410. If there are, the adjacent sector may be treated as the selected sector, at 1412, and the method 1400 may continue with determining the PES value, at 1404, and with selecting a WFT value for the next adjacent sector, at 1406, based on the PES values of the adjacent sector. In certain embodiments, the process 1400 may repeat for the number of contiguous sectors corresponding to a write operation, or to multiple successive write operations. If there are no additional contiguous sectors to write after the latest written sector, at 1410, the method may end at 1414.

Figure 15:
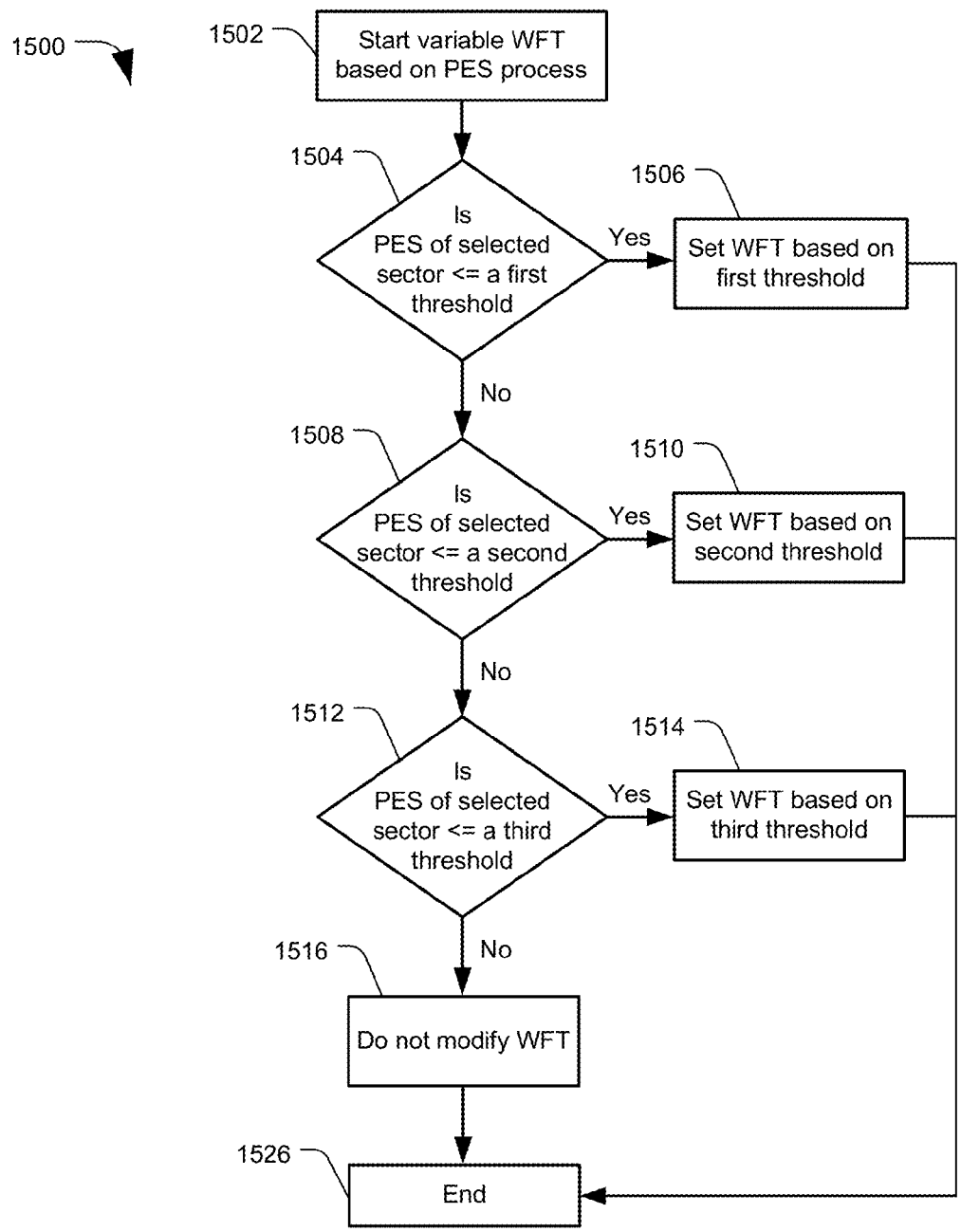
FIG. 15 is a flowchart of a method employing a variable write fault threshold, in accordance with certain embodiments of the present disclosure.

FIG. 15 is a flowchart of a process with variable write fault thresholds, generally designated 1500, in accordance with certain embodiments of the present disclosure. The process 1500 may be implemented as a decision system within systems 100, 200, or any of the other systems and processes described herein. For example, process 1500 may be implemented as a logic circuit or firmware in a controller accessible memory. The process 1500 can define multiple thresholds for a variable write threshold system to implement, and can define the conditions for when different write fault thresholds may be applied. The process 1500 may be implemented for adjacent sectors, and in some embodiments, may be implemented for each contiguous adjacent sectors corresponding to one or more write operations.

The process 1500 may include initiating a variable WFT process based on a PES, at 1502, such as done at step 1404. The process 1500 may evaluate the PES to determine if the PES value is less than a first threshold, at 1504. If the PES value is less than or equal to the first threshold, a first WFT threshold may be set based on the first threshold, at 1506. If the PES value is greater than the first threshold, the PES value may be evaluated to determine if the PES value is less than or equal to a second threshold, at 1508.

If the PES value is less than or equal to the second threshold, a second WFT threshold may be set based on the second threshold, at 1510. If the PES value is greater than the second threshold, the PES value may be evaluated to determine if the PES value is less than or equal to a third threshold, at 1512. If the PES value is less than or equal to the third threshold, a third WFT threshold may be set based on the third threshold, at 1514. If the PES value is greater than the third threshold, a current WFT of a corresponding sector may not be modified, or may be set to a default WFT, at 1516.

The process 1500 is an example of a decision processing that can be implemented by the systems described herein. The process 1500 may be modified, such as by adding or removing threshold decisions or by adding another granularity of PES value comparison (such as in system 1300). Once a WFT for an adjacent sector is determined, the adjacent sector can be written utilizing the determined WFT. The process 1500 can be repeated for each next sector to be written.

The processes and methods described herein with respect to a variable write fault threshold (e.g. as described with respect to FIGS. 13-15) and applying a write fault threshold for a set of tracks (e.g. as described with respect to FIGS. 11-12) may be implemented separately or can be implemented jointly. In some examples, only the variable write fault threshold processes may be implemented on a data storage device. In other embodiments, only the processes for applying a write fault threshold to a set of tracks may be implemented on a data storage device. In yet other embodiments, both types of processes may be implemented on a single data storage device or a single data storage controller. When both types of processes are implanted on a single data storage device, they may be implemented to operate collectively (e.g. a budget set by the applying a write fault threshold may be utilized by the data storage controller to determine the PES thresholds or the OCLIM settings of a variable write fault threshold decision system) or may be implemented to operate independently.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:
1. An apparatus comprising:
   a control circuit configured to:

receive a position error signal value for a first data sector;

set a first write fault threshold for a second data sector adjacent the first data sector based on the position error signal value, the first data sector and the second data sector part of a first track and the first write threshold is variable on a sector-by-sector basis of the first track; and implement the first write fault threshold while writing data to the second data sector.

2. The apparatus of claim 1 further comprising the controller circuit configured to:

set the first write fault threshold for a first side of the first data sector in a direction of a second track;

apply a second write fault threshold for a second side of the first data sector opposite of the direction of the second track; and the second write fault threshold is a not varied on a per sector basis and is a same value for each data sector of the first track.

3. The apparatus of claim 1 further comprising:

a disc data storage medium having data storage tracks and servo information, the first data sector and second data sector located in the data storage tracks;

a head adapted to write data to the disc data storage medium; and a servo control system configured to determine the position error signal based on the servo information.

4. The apparatus of claim 1 further comprising the control circuit configured to:

determine if the position error signal value is less than a first threshold;

when the position error signal value is less than the first threshold, set the first write fault threshold to a first value;

when the position error signal value is not less than the first threshold, determine if the position error signal value is less than a second threshold; and when the position error signal value is less than the second threshold, set the first write fault threshold to a second value different than the first value.

5. The apparatus of claim 4 further comprising the control circuit configured to:

when the position error signal value is not less than the second threshold, set the first write fault threshold to a default value different than the first value and the second value.

6. A method comprising:

determining a position error signal value corresponding to a first data sector of a data storage medium;

selecting a first write fault threshold for a second data sector adjacent to the first data sector based on the position error signal value, the first data sector and the second data sector part of a first track and the first write threshold is variable on a sector-by-sector basis of the first track; and setting the first write fault threshold to be implemented when writing data to the second data sector.

7. The method of claim 6 further comprising determining if the position error signal value is less than a threshold and selecting the first write fault threshold when the position error value is less than the threshold.

8. The method of claim 7 further comprising:

when the position error value is less than the threshold, performing:

determining if the position error signal value is less than a first sub-threshold;

when the position error signal value is less than the first sub-threshold, setting the first write fault threshold to a first value;

when the position error signal value is not less than the first sub-threshold, determining if the position error signal value is less than a second sub-threshold;

when the position error signal value is less than the second sub-threshold, setting the first write fault threshold to a second value different than the first value; and when the position error signal value is not less than the second sub-threshold, setting the first write fault threshold to a default value different than the first value and the second value.

9. The method of claim 7 further comprising:

when the position error value is greater than the threshold, performing:

determining if the position error signal value is less than a first sub-threshold;

when the position error signal value is less than the first sub-threshold, setting the first write fault threshold to a first value;

when the position error signal value is not less than the first sub-threshold, determining if the position error signal value is less than a second sub-threshold; and when the position error signal value is less than the second sub-threshold, setting the first write fault threshold to a second value different than the first value.

10. The method of claim 6 further comprising repeating the method for each of a set of contiguous sectors located in the first track.

11. A memory device storing instructions that, when executed, cause a processor to perform a process comprising:

determining a position error signal value corresponding to a first sector of a data storage medium;

setting a first write fault threshold for a second sector adjacent to the first sector based on the position error signal value, the first sector and the second sector both located in a first track of the data storage medium;

setting the first write fault threshold for a first side of the second sector in a direction of a second track of the data storage medium, such that the first write threshold is variable on a sector-by-sector basis; and implementing the first write fault threshold when writing data to the second sector.

12. The memory device of claim 11 further comprising the process including:

applying a second write fault threshold for a second side of the second data sector opposite of the direction of the second track, the second write fault threshold not variable on a sector-by-sector basis; and repeating the process for each of a set of contiguous sectors of the first track.

13. The memory device of claim 11 further comprising the process including determining if the position error signal value is less than a threshold and selecting the first write fault threshold when the position error value is less than the threshold.

14. The memory device of claim 13 further comprising the process including:

writing data to the second sector;

determining a second position error signal corresponding to the second sector;

setting a second write fault threshold for a third data sector based on the second position error signal value; and implementing the second write fault threshold when writing data to the third data sector.

* * * * *